May 23, 1961 W. C. ARRASMITH 2,985,869
WARNING APPARATUS

Filed July 28, 1958

INVENTOR:
William C. Arrasmith

By Smyth & Roston
Attorneys

May 23, 1961  W. C. ARRASMITH  2,985,869
WARNING APPARATUS
Filed July 28, 1958
2 Sheets-Sheet 2
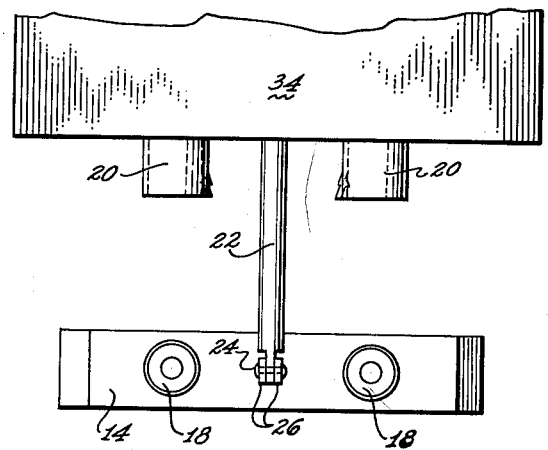
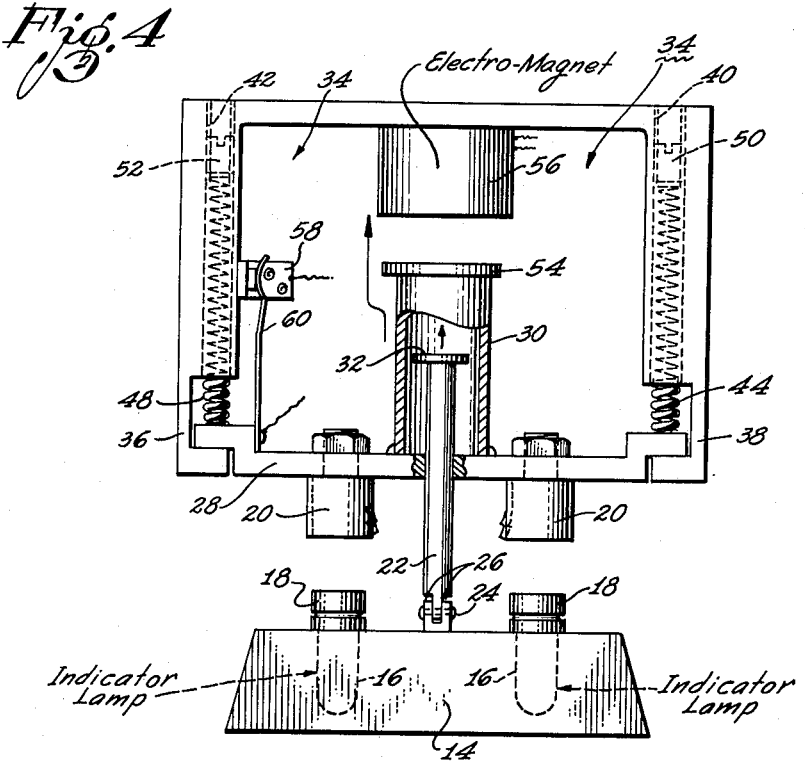
INVENTOR:
William C. Arrasmith
By Smyth & Roston
Attorneys

United States Patent Office

2,985,869
Patented May 23, 1961

2,985,869
WARNING APPARATUS

William C. Arrasmith, Los Angeles, Calif., assignor to Radar Relay, Inc., Los Angeles, Calif., a corporation of California Filed July 28, 1958, Ser. No. 751,233

3 Claims. (Cl. 340—213)

The invention relates to electrical warning apparatus of the annunciator type, and it is more particularly directed to improved apparatus for providing a centralized alarm upon the occurrence of a fault or hazardous condition at any one of a plurality of remote points.

The apparatus of the invention is especially useful in aircraft, and it will be described as installed in an aircraft. It will become evident as the description proceeds, however, that the invention has a wide field of use in any application in which an alarm is to be given upon the occurrence of a distant fault or hazardous condition.

Annunciator warning systems of the type with which the present invention is concerned are generally known. Such systems have been described, for example, in copending applications Serial Nos. 505,305, filed March 2, 1955, which issued as Patent 2,887,667 on May 19, 1959; 617,618, filed October 22, 1956, which issued as Patent 2,934,752 on April 26, 1960; and 707,311 filed January 6, 1958; all these applications having been filed in the name of the present inventor.

Annunciator warning systems of the prior art usually contain a plurality of indicator lamps positioned on a central control board and connected to respective sensing elements. The sensing elements are located at the various positions to be monitored, and when a fault or a hazardous condition occurs at any one of the positions, the indicating lamp corresponding to that position becomes illuminated.

Each of the indicator lamps, or each pair of such lamps shunt-connected in accordance with usual practice, is usually positioned behind an individual translucent strip bearing inscriptions identifying the particular condition represented by that lamp or pair of shunt-connected lamps. Then, when the condition occurs and the corresponding sensing element activates the indicator lamp, or pair of lamps, the strip or panel is illuminated to cause its inscriptions to become visible.

It is also usual in the prior art annunciator warning systems to incorporate a master warning indicator. The master warning indicator is actuated simultaneously with the illumination of the particular individual annunciator panel discussed above. The master warning indicator may be a relatively bright lamp, and its purpose is to draw the pilot's attention to the fact that a fault or hazardous condition has arisen. An acknowledgement switch is usually provided to enable the pilot to de-energize the master warning indicator after it has served its purpose.

However, even after the master warning indicator has been de-energized in the prior art apparatus, this being achieved by the pilot actuating the acknowledgment switch, the illuminated annunciator panel continues to be lighted until the hazardous condition indicated by it has been corrected. Moreover, the deenergized master warning indicator is ready to be energized again should another hazardous condition arise at a different position.

The situation often occurs in conjunction with annunciator warning systems in which it is desired to place an instrumentality associated with a group of annunciator panels in a stand-by condition. When the instrumentality is placed in its stand-by condition, the entire bank of annunciator panels used to monitor its operation normally become illuminated. For example, when a group of annunciator panels are used to monitor a particular aircraft engine and that engine is purposely placed in an inoperative condition, all the monitored conditions of that engine become such that the corresponding annunciator panels are all illuminated.

The condition described above has created an objectionable situation in that it can cause the pilot to be distracted by a fully illuminated group of panels, when that group merely indicates conditions the pilot knows to exist. Also, this can serve to distract the pilot from other activated annunciator panels.

In an attempt to solve the above problem, prior art annunciator apparatus has been constructed in which the individual annunciator panels may be pivoted slightly, with such pivoting causing their indicator lamps to be deenergized. Then, for the condition described in the preceding paragraph, each panel of the group associated with the inoperative instrumentality can be pivoted so that the entire bank of indicator lamps can be deactivated.

Several limitations have manifested themselves in the prior art apparatus described immediately above, in whch the individual annunciator panels may be physically pivoted to deactivate their corresponding indicator lamps. One of these limitations is that the pivoted deenergized panels tend to hide other panels of the activated groups, and thereby obstruct the pilot's vision with respect to those other panels. Another limitation in the prior art apparatus of this type, and probably a more serious one, is the fact that dependence must be placed on the pilot's memory to re-activate the group of annunciator panels when the instrumentality they are monitoring is again placed in operation.

The apparatus of the present invention is constructed so that its individual annunciator panels may be deactivated for the reasons described above. However, the apparatus of the invention is advantageous in that, although each of its annunciator panels may be placed in a de-activated state when a fault or hazardous condition has been sensed, the fault must first be acknowledged by actuating the acknowledgement switch; and as soon as the fault is corrected, each panel is again activated automatically and ready to re-indicate the fault should it occur.

Therefore, in applying the present invention to the example given above, as soon as the particular engine is placed in a stand-by condition so that its group of annunciator panels are illuminated, the pilot will depress the acknowledgement switch to acknowledge that he is aware of the condition and to de-energize the master warning indicator. Then, with the present invention, the pilot can de-activate each of the now illuminated annunciator panels. The panels will remain de-activated as long as the fault continues. However, as soon as the engine is again placed in operation, all its annunciator panels are automatically returned to their activated state in which they are ready to indicate the occurrence of any of the monitored faults.

In the embodiment of the invention to be described, should an annunciator panel glow thereby indicating that the designated fault has occurred, this glowing is accompanied by the simultaneous glowing of the master warning indicator. As mentioned above, the pilot can de-activate the illuminated annunciator panel if he chooses. His procedure is first to actuate the acknowledgement switch to turn off the master warning indicator, and he then can de-energize the annunciator panel in question, the latter operation being accomplished by pressing the glowing panel inwardly. When the above operations have been followed, the glowing panel will be extinguished when it is pressed inwardly, and it will be held in the "in" position by an energized electromagnet.

An advantage of the arrangement described above is that the de-activated panel is in an out of the way or any other panels which may still be in an activated condition. The de-activated panel, therefore, and unlike the prior art apparatus, in no way obstructs the pilot's vision with respect to the still activated annunciator panels. Immediately after the fault in question has been corrected, the electro-magnet holding in the particular de-activated panel is de-energized, and the panel is returned to its "out" position so that it is again ready for action.

A further advantage of the improved annunciator apparatus of the invention is the fact that each panel has what may be termed a "manual override" feature. That is, at any time the operator wishes to re-activate a de-activated annunciator panel, he may pull the panel out against the force of the electro-magnet to return it to its activated "out" position. The electro-magnet's attraction with each particular annunciator panel is such that it does not have the power to draw a panel in from its "out" position. The electro-magnet has only sufficient power to hold a panel in its "in" position when such a panel has been manually moved against a spring bias to that position and into the vicinity of the electro-magnet.

The individual annunciator panels of the present invention each has an additional feature in that it cannot be removed from its associated circuitry. This obviates any danger of a particular panel being inserted in a wrong socket so that its inscription bears an erroneous indication of the actual hazard or fault the panel is intended to represent. In the apparatus of the present invention a telescoping linkage is provided between each panel and the housing of its associated circuitry. This linkage permits a panel to be moved out to a position in which its indicator lamps may be replaced, and the linkage prevents the panel from being removed completely from the housing.

Other features and advantages of the invention will become apparent from the following description, particularly when the following description is taken in conjunction with the accompanying drawings in which:

Figure 3 is a top fragmentary view of a capsule and its associated annunciator panel, the assembly being on an enlarged scale with respect to Figures 1 and 2, and the view of Figure 3 showing how a particular annunciator panel can be withdrawn on its telescoping linkage and turned down conveniently to permit its indicator lamps to be removed for replacement purposes;

Figure 5:
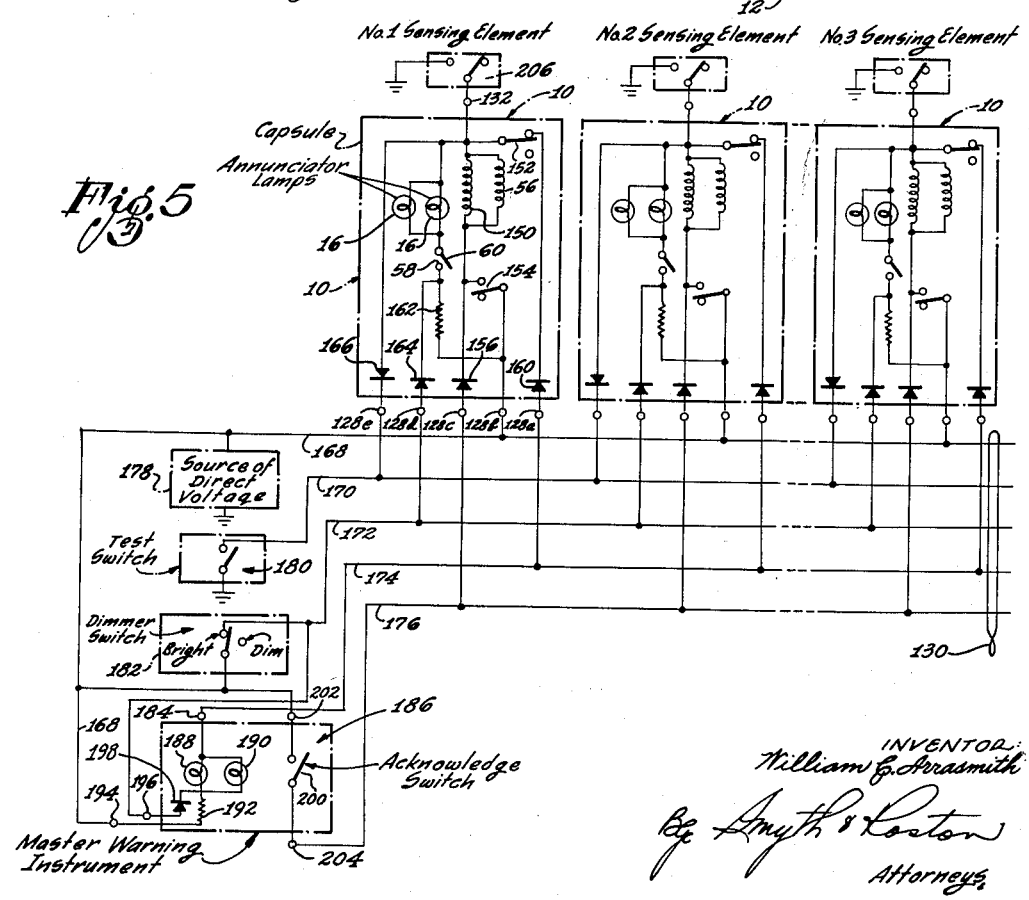

Figure 4 is a top plan view, on an enlarged scale with respect to Figure 3, of a capsule and its annunciator panel; certain of the electrical components of the capsule being removed so that the various elements which combine to provide the combination of the present invention may be clearly shown; and Figure 5 is a circuit diagram of the electrical components which make up an annunciator warning system in which the present invention may be incorporated, and this view also showing the electrical circuitry associated with the components.

In the annunciator apparatus of the present invention, and similar to the apparatus of copending application Serial No. 707,311, referred to above, the control circuit for each annunciator panel may be individually housed in an independent capsule, and an associated translucent annunciator panel unit may be plugged into the capsule. A stack of such capsules are indicated at 10 in Figure 2, and the capsules may be held in a stacked condition by means of studs, such as a stud 12 having a nut threaded to each end.

A plurality of translucent panels or strips 14 are respectively associated with each of the capsules in the stack 10. Each of the translucent panels 14 has a pair of shunt-connected annunciator indicator lamps and associated sockets held in it. This arrangement is more clearly shown in Figures 3 and 4. As shown in these figures, each annunciator panel 14 has a pair of lamps 16 extending into it and held in the panel by friction fit, with each lamp extending into an associated plug 18. When the annunciator panel is in place, the plugs 18 are plugged into corresponding sockets 20 (Figures 3 and 4) associated with its corresponding capsule. When the plugs 18 are plugged into the associated sockets 20, electrical contact may be made to the lamps 16 and the particular panel 14 is physically held in place.

Figure 1:
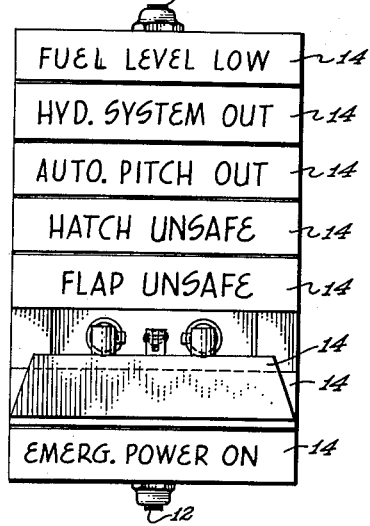
Figure 1 is a front view of a plurality of annunciator capsules and their associated annunciator panels, the capsules being stacked and assembled one over the other so that the different panels form a bank corresponding to a group of monitored conditions, with each panel containing an inscription corresponding to the condition monitored by it.

As shown in Figure 1, the front face of each of the translucent panels 14 is appropriately inscribed to represent a particular hazardous condition. These inscriptions are normally not visible. However, whenever a pair of annunciator lamps is energized, the corresponding translucent panel 14 is illuminated to reveal its inscriptions and thereby indicate the location of the fault or hazardous condition that has arisen.

It is evident that from time to time it will be necessary to replace one or more of the indicator lamps 16 in the different annunciator panels 14 as these lamps become burned out. It is also most important that the panels cannot be removed from their associated capsule, otherwise a panel could be erroneously replaced so that its inscription does not tally with the area monitored by the particular capsule.

As more clearly shown in Figure 4, each annunciator panel 14 is pivotally mounted on the end of a rod 22 by means of a pin 24, the pin extending through a pair of ears 26 affixed to the rear surface of the annunciator panel 14. The rod 22 extends back through a bracket 28 which supports the sockets 20 and into a cylinder 30 which is mounted on the rear surface of the bracket 28 in coaxial relationship with the rod 22. The rod 22 is secured to a piston 32 at its remote end, and this piston is adapted to move reciprocally within the cylinder 30. The piston 32 serves as a stop, and it engages the rear surface of the bracket 28 when the panel 14 is withdrawn to its fully extended position. However, when the panel 14 is in place, its plugs 18 extend into the corresponding sockets 20 so that the panel is held on the bracket 28, and the piston 32 is at the remote end of the cylinder 30.

When it is desired to replace a burned out indicator lamp 16, the particular panel 14 is manually grasped and pulled out from its capsule. The first thing that happens is that the plugs 18 move out of the corresponding sockets 20 and the rod 22 begins to move out from the cylinder 30, this condition being shown in Figure 4. Then, the panel 14 is moved out until its motion is limited by the engagement of the piston 32 with the bracket 28. Then, the panel 14 may be turned down about its pivot pin 24 to the position shown in Figure 3. The plugs 18 are now fully revealed so that they can be removed and their indicator lamps replaced. Then, the panel 14 can be reinserted in its associated capsule.

Figure 2:
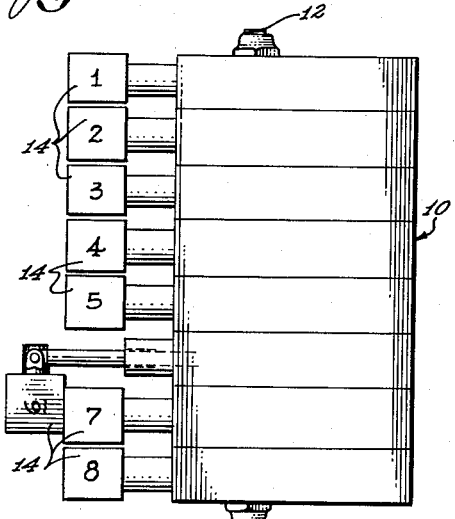
Figure 2 is a side view of the stack of annunciator capsules and their associated panels, this latter view showing how each annunciator panel may be pushed in to a de-activated position and how each may be pulled out without being removed from its associated capsule for purposes of replacing its indicator lamps.

The view of Figure 2 indicates one of the panels 14, designated number 6, withdrawn to its extended position and turned down so that a new indicator lamp may be inserted. The panel 14 in its distended position is also shown in Figure 1. It will be appreciated, that the above described mechanism provides a convenient means for replacing burned out indicator lamps, and it also assures that a particular annunciator panel 14 is never removed from its proper capsule.

The housing of the particular capsule shown in Figures 3 and 4 is designated 34. As illustrated particularly in Figure 4, the bracket 28 is supported in the housing 34 for reciprocal motion within a pair of channels formed in the respective side walls 36 and 38 of the housing. These side walls have respective threaded passageways 40 and 42 extending through them, and a pair of springs 44 and 48 are disposed in respective ones of the passageways. These springs bear against the opposite ends of the bracket 28, and they resiliently bias the bracket against a pair of shoulders formed in the respective side walls 36 and 38 of the housing 34. The springs are held in compression in the respective passageways 40 and 42 by a pair of set screws 50 and 52 which are threaded into the respective passageways.

The rear end of the cylinder 30 has a disk-like member 54 of magnetic material secured to it, and an electromagnet 56 is mounted in the housing 34 in axial alignment with the disk-like member 54. The electro-magnet 56 is spaced from the member 54, and when the electromagnet is energized its resulting magnetic field is not sufficient to draw the member 54 to it. However, when the particular annunciator panel 14 is manually moved inwardly, so that the bracket 28 and the cylinder 30 are moved toward the electro-magnet 56, the member 54 is brought under the influence of the magnet 56 and the field strength of the magnet is sufficient so that when the magnet is energized it will hold these elements in an "in" position. An annunciator panel so held in its "in" position is designated by the panel 3 in Figure 2.

A fixed switch contact 58 is mounted on the base of the housing 34, and this contact is selectively engaged by an armature 60 which is supported on the bracket 28. When the bracket is in its "out" position as illustrated in Figure 4, the armature 60 makes electrical contact with the fixed contact 58. However, when the bracket 28 is moved inwardly to its "in" position, electrical contact between the armature 60 and the fixed contact 58 is broken.

It will be remembered that the assembly of the invention is such that any annunciator panel 14 may be moved inwardly to de-energize its indicator lamps 16. However, the particular annunciator panel will be held in its "in" position only when its electro-magnet 56 is energized. As discussed above, the corresponding electromagnet 56 is energized only when the particular fault which causes the particular annunciator panel to be illuminated has been acknowledged, and then only so long as the fault persists. As soon as the fault is corrected, the electro-magnet 56 becomes de-energized and the springs 44 and 48 immediately return the bracket 28 to its activated "out" position in which the armature 60 again makes contact with the fixed contact 58. When the armature 60 contacts the contact 58, the indicator lamps 16 may again be energized should the fault occur.

The electrical control system that may be incorporated into each of the capsules of the stack 10, and the connections between the capsules to the various other controls, may be of the type shown in Figure 5. Since the circuits in the different capsules may be identical, only one will be described. As mentioned previously, this control system may be similar to the one disclosed and claimed in copending application Serial No. 707,311 referred to above.

Each capsule has a plurality of terminals designated 128a, 128b, 128c, 128d and 128e, and each capsule has a further terminal 132. Each capsule contains a relay having an energizing winding 150, and the energizing winding of the electro-magnet 56 is connected in shunt with the winding 150. The relay included in the capsule includes a pair of armatures 152 and 154. When the winding 150 is energized, the armature 152 opens its upper contact and closes on its inactive lower contact. At the same time, when the relay winding 150 is energized, the armature 154 moves from its inactive lower contact and closes with its upper contact.

One terminal of the relay winding 150 is connected to the terminal 132 and the other terminal of this winding is connected to the cathode of a diode 156, the anode of this diode being connected to the terminal 128c. The upper contact associated with the relay armature 154 is connected to the junction of the diode 156 and the relay winding 150. The armature 154, itself, is connected to the terminal 128b. The relay armature 152 is connected to the junction of the winding 150 and the terminal 132, and the upper contact associated with this latter armature is connected to the cathode of a diode 160. The anode of the diode 160 is connected to the terminal 128a.

The two annunciator lamps 16 which, as previously described, are mounted in the translucent panel 14, are shunt-connected as shown in Figure 5. These shunt or parallel-connected lamps are connected through their sockets to the common junction of the relay winding 150 and the terminal 132. These lamps are also connected to the armature 60 which was described in conjunction with Figure 4. The fixed contact 58 of Figure 4 is connected to a resistor 162, and this resistor is connected to the terminal 128b.

A diode 164 has its cathode connected to the junction of the lamps 16 and the resistor 162, and the anode of this diode is connected to the terminal 128d. A diode 166 has its cathode connected to the terminal 128e, and the anode of this diode is connected to the terminal 132.

The elements and circuitry described above constitute the internal connections and the components of each of the capsules of the stack 10 of Figures 1 and 2. Two indicator lamps 16, connected in shunt as shown, are preferably used so that if one burns out the indication is not lost. The fact that there is a burned out indicator lamp, and that a replacement should be made, is revealed the next time that the particular annunciator panel is illuminated by the loss of illumination.

A cable 130 in Figure 5 connects to the terminals of the different capsules in the stack 10. The different leads in the cable are represented in Figure 5 as 168, 170, 172, 174 and 176 respectively. Each of these leads is connected to a corresponding one of the terminals 128a, 128b, 128c, 128d and 128e of each of the capsules in the stack 10. As shown in Figure 5, the lead 168 connects with the terminal 128b, the lead 170 connects with the terminal 128e, the lead 172 connects with the terminal 128d, the lead 174 connects with the terminal 128a, and the lead 176 connects with the terminal 128c; these connections are repeated for each of the capsules of the stack 10.

The lead 168 is connected to the positive terminal of a source 178 of direct voltage, the negative terminal of this source being grounded. The lead 170 is connected to the fixed contact of a test switch 180, the switch being in the form of a single-pole single-throw manually operated push-button switch. The armature of this switch is normally biased out of engagement with its fixed contact and the armature is grounded.

The lead 172 is connected to the fixed contact of a dimmer switch 182. This latter switch may also be of the form of a single-pole single-throw manually operated push-button switch. The armature of the dimmer switch 182 is connected to the positive terminal of the source 178, and it is normally biased into engagement with its fixed contact. When the armature of the dimmer switch is depressed, the connection from the positive source 178 to the lead 172 is broken.

The lead 174 is connected to a terminal 184 of a master warning indicator 186 which will be described. The terminal 184 is connected to one side of a pair of shunt-connected master warning lamps 188 and 190. A resistor 192 is connected to these lamps and to a terminal 194 of the master warning indicator. A further terminal 196 of the instrument is connected to the anode of a diode 198, and the cathode of this diode is connected to the junction of the lamps 188, 190 and the resistor 192. The terminal 196 is connected externally to the lead 172.

The master warning instrument 186 also includes an acknowledge or reset switch 200. This switch is normally spring-biased to an open condition, and it is a single-pole single-throw push-button type. The switch 200 has a fixed contact which is connected to a terminal 202 of the master warning indicator 186, and this terminal in turn is connected to the positive terminal of the source 178. The armature of the switch 200 is connected to a terminal 204 of the master warning indicator, and this latter terminal is connected externally to the lead 176. The terminal 194 of the indicator is connected externally of the positive terminal of the source 178 of the direct voltage.

The terminal 132 is connected to the armature of a switch 206 incorporated in a sensing element No. 1 at the area to be monitored. This switch 206 is actuated in known manner to close upon the occurrence of the monitored condition. The switch includes a fixed contact which is grounded, and the armature of the switch closes with that fixed contact upon the occurrence of a certain condition as, for example, the rise of pressure or temperature above a selected threshold, a drop in oil pressure, the mechanical shifting of an element, and so on. Sensing elements, in themselves, are well known to the art. It is believed, therefore, that a detailed description of such an element is not necessary in the present specification.

Assume now that the hazardous condition monitored by the sensing element No. 1 has occurred, thereby causing the armature of the switch 206 in that element to close on its grounded fixed contact. The closure of the armature 206 places a ground on the terminal 132 of the capsule, and this completes a circuit from the negative terminal of the source 178 through the annunciator lamps 16, through the switch contacts 60, 58 (which are now assumed to be closed), through the diode 164 and through the switch 182 to the positive terminal of the source 178. The annunciator lamps 16, therefore, glow brightly to light up the inscriptions on their associated translucent panel 14.

The closure of the switch 206 in the sensing element No. 1 also completes a circuit from the negative terminal of the source 178 through the terminal 132, through the armature 152 of the relay and its upper contact, through the diode 160, through the master warning indicator lamps 188 and 190, through the diode 198, and through the dimmer switch 182 to the positive terminal of the source 178. Therefore, the lamps 188 and 190 of the master warning instrument also glow brightly.

When the operator's attention has been attracted by the glowing lamps in the master warning indicator, that indicator has served its purpose. Now, the master warning lamps 188 and 190 can be de-energized and placed in readiness to indicate another monitored hazardous condition that might arise. This de-energizing of the master warning lamps is accomplished by closing the acknowledge switch 200.

When the acknowledge switch is closed, the lead 176 connects the terminal 128c of the capsule to the positive terminal of the source 178. This causes the relay winding 150 to be energized to move the armature 154 to its upper contact. This armature establishes a holding circuit which holds the relay winding 150 energized as long as the fault at the No. 1 sensing element causes the switch 206 to remain closed. The energizing of the relay winding 150 also causes the armature 152 to move from its upper contact to break the connection to the master warning indicator lamps 188 and 190. The master warning indicator lamps, therefore, are now de-energized. However, the annunciator indicator lamps 16 remain energized and their corresponding translucent panel 14 continues to glow as long as the fault continues.

The dimmer switch 182 serves as a means for dimming the annunciator lamps and the master warning lamps when so desired. When the dimmer switch is depressed, the circuit through the diode 164 from the annunciator lamps 16 is broken, and an auxiliary circuit through the resistor 162 and through the terminal 128b to the positive terminal of the source 178 is established. The annunciator lamps 16 continue to glow, therefore, but with reduced luminance because the resistor 162 has now been placed in their energizing circuit. The actuation of the dimmer switch 182 also breaks the circuit from the master warning lamps 188 and 190 through the diode 198, and this actuation causes these lamps to be energized through the terminal 194 and through the resistor 192. The master warning lamps, therefore, also continue to glow but with reduced brilliance.

The test switch 180 is effectively connected through the diode 166 in shunt across the sensing elements. Whenever this test switch is actuated, it simulates the closure of the switches in all the sensing elements so that appropriate tests can be made to assure that the system is in proper working order.

The diode 160 in each of the capsule circuits functions as inter-circuit isolation means (as described in the above-mentioned copending application Ser. No. 707,311) to prevent the closure of one of the sensing elements, and the resulting energizing of the master warning lamps, from energizing the annunciator lamps associated with other sensing elements. That is, the diode 160 enables a common master warning circuit to be connected to a plurality of independent annunciator circuits without causing inter-action between the latter circuits.

The diode 164, in like manner, functions as an isolation means and permits a common dimmer circuit to be connected to a plurality of independent annunciator circuits without producing inter-action between the annunciator circuits when the dimmer switch is open. Likewise, the isolation diode 156 permits a single acknowledge switch 200 to be used to control all the capsule units without producing inter-action between the independent annunciator lamp circuits when this switch is open. The isolation diode 166, in like manner, prevents inter-action between the annunciator circuits due to the single circuit to the test switch 180.

It will be appreciated that when a fault occurs, for example, in the sensing element No. 1, the annunciator lamps 16 and the master warning lamps 188 and 190 are immediately lighted. However, no current flows through the relay winding 150 or through the winding of the electro-magnet 56. Therefore, should the annunciator panel 14 of Figure 4 be pushed in to move the bracket 28 to its "in" position, the resulting opening of the switch contacts 58 and 60 would cause the indicator lamps 16 to be de-energized. However, the bracket 28 normally moves back to its outer position as soon as the manual pressure is removed because the electro-magnet 56 is not normally energized. It is only when the fault has been acknowledged by the depression of the acknowledge switch 200 are the relay winding 150 and the winding of the electro-magnet 56 energized. Then, when the assembly of Figure 4 is moved to its "in" position, the electromagnet 56 will hold it in that position with the indicator lamps 16 de-energized. As soon as the fault is corrected, the current flow through the winding 150 and through the winding of the electro-magnet 56 is terminated so that the assembly of Figure 4 immediately returns to its activated condition.

The invention provides, therefore, an improved annunciator warning apparatus in which an individual annunciator panel, or a group of such panels, may be de-activated when so desired without obscuring other activated panels. However, this de-activation of an annunciator panel can only be made after the fault indicated by the panel has been acknowledged. Moreover, the panel automatically returns to its activated state, as soon as the fault has been removed.

The apparatus of the present invention is also convenient in that it is constructed so that the different indicator lamps may be easily replaced when they become burned out, and so that there is no chance of the different annunciator panels being returned to the wrong capsules after such replacements have been made.

I claim:

1. An annunciator unit for use in an electrical warning system including: a housing, bracket means mounted in the housing and reciprocally movable in the housing between an "out" and an "in" position, spring means for resiliently biasing the bracket means to its "out" position, a translucent panel having inscriptions formed on its front surface and constructed to receive at least one indicator lamp, circuit means for energizing the indicator lamp upon the happening of a monitored condition, means for supporting the translucent panel on the bracket means for movement with the bracket means, relay means including normally-closed contacts included in said circuit means for providing a master warning upon the happening of the monitored condition and further including a relay winding, acknowledging means for energizing said relay winding, acknowledging means for energizing said relay winding to open said normally-closed contacts upon the acknowledgment of the happening of the monitored condition, electro-magnetic means for holding the bracket means in its "in" position upon the movement thereof from its "out" position to its "in" position, switch means included in said circuit means for de-energizing the indicator lamp in the translucent panel upon the movement of the bracket means to its "in" position, said electro-magnetic means including a winding connected to said relay winding for energizing the electro-magnetic means upon the acknowledgment of the happening of the condition monitored by the unit.

2. An indicator unit for use in an electrical warning system including: a housing, electrical socket means mounted in the housing, a translucent panel having inscriptions formed on the front surface thereof and adapted to have at least one annunciator lamp mounted within its interior to illuminate the inscriptions, circuit means for energizing said lamp upon the happening of a monitored condition, plug means for the lamp mounted on the translucent panel and protruding from the rear surface thereof to be insertable in the socket means so as to establish electrical contact from said circuit means to the annunciator lamp and to support the panel on the housing, reciprocally movable bracket means in the housing for supporting the electrical socket means, spring means for biasing the bracket means outwardly against a shoulder formed in the housing, means secured to the bracket means and projecting rearwardly therefrom within the housing, metallic means mounted on the end of said projecting means and adapted to be attracted by a magnetic field, relay means including normally-closed contacts included in said circuit means for providing a master warning upon the happening of the monitored condition and further including a relay winding, acknowledging means for energizing said relay winding to open said normally-closed contacts upon the acknowledgment of the happening of the monitored condition, electro-magnetic means mounted in the housing in spaced relationship with the metallic means when the bracket means is biased outwardly against said shoulder, said electro-magnetic means attracting the metallic means and holding the bracket means in an inner position upon the movement of the bracket means inwardly towards the electro-magnetic means, said electro-magnetic means including a winding connected to said relay winding for energizing the electro-magnetic means upon the acknowledgment of the happening of the condition monitored by the unit and switching means responsive to such inward motion of the bracket means for breaking the electrical contact to the annunciator lamp.

3. An indicator unit for use in an electrical warning system including: a housing, electrical socket means mounted in the housing, a translucent panel having inscriptions formed on the front surface thereof and adapted to have at least one annunciator lamp mounted within its interior to illuminate the inscriptions, plug means for the lamp mounted on the translucent panel and protruding from the rear surface thereof to be insertable in the socket means so as to establish electrical contact to the annunciator lamp and to support the panel on the housing, reciprocally movable bracket means in the housing for supporting the electrical socket means, spring means for biasing the bracket means outwardly against a shoulder formed in the housing, cylindrical means secured to the bracket means and projecting rearwardly therefrom within the housing, means including a rod secured to the translucent panel and extending into the cylindrical means in slidable relationship therewith for permitting the outward movement of the panel to a limited extended position to thereby prevent the removal of the panel from the bracket means, magnetic means mounted on the end of said cylindrical means and adapted to be attracted by a magnetic field, electro-magnetic means mounted in the housing in spaced relationship with the magnetic means when the bracket means is biased outwardly against said shoulder, said electro-magnetic means attracting the magnetic means and holding the bracket means in an inner position upon the movement of the bracket means inwardly toward the electro-magnetic means, and switch means responsive to such inward motion of the bracket means for breaking the electrical contact to the annunciator lamp.

References Cited in the file of this patent

UNITED STATES PATENTS

| | | |
|---|---|---|
| 1,801,864 | Hutchison et al. | Apr. 21, 1931 |
| 1,919,114 | Ley | July 18, 1933 |
| 2,087,576 | Miller | July 20, 1937 |
| 2,686,908 | Amundson et al. | Aug. 17, 1954 |
| 2,703,875 | Watanabe et al. | Mar. 8, 1955 |
| 2,710,910 | Grimes | June 14, 1955 |
| 2,877,584 | Dupree | July 11, 1955 |
| 2,890,445 | Korry | June 9, 1959 |
| 2,907,872 | Wilson | Oct. 6, 1959 |